United States Patent
La Valle

[15] 3,698,061
[45] Oct. 17, 1972

[54] APPARATUS FOR FORMING AND TESTING ELECTRICAL COMPONENTS

[72] Inventor: Thomas Alvin La Valle, Annapolis, Md.

[73] Assignee: Western Electric Company Incorporated, New York, N.Y.

[22] Filed: Aug. 13, 1971

[21] Appl. No.: 171,433

Related U.S. Application Data

[62] Division of Ser. No. 878,017, Nov. 19, 1969, Pat. No. 3,618,204.

[52] U.S. Cl. .............................................29/203 D
[51] Int. Cl. .............................................H01r 43/00
[58] Field of Search .29/203 D, 203 R, 208 C, 208 R, 29/593

[56] References Cited

UNITED STATES PATENTS

| | | | |
|---|---|---|---|
| 2,100,502 | 11/1937 | Campbell et al. | 228/18 |
| 2,606,268 | 8/1952 | Pityo et al. | 219/107 |
| 3,214,832 | 11/1965 | Schwinghamer | 29/427 |
| 3,400,448 | 9/1968 | Helda et al. | 29/471.1 |
| 3,473,213 | 10/1969 | Brown | 29/203 D |
| 3,525,151 | 8/1970 | Pellerin | 29/624 |

*Primary Examiner*—Thomas H. Eager
*Attorney*—W. M. et al.

[57] ABSTRACT

A turntable having workholders spaced about the periphery thereof is indexed to advance each of the workholders successively through work stations positioned adjacent the periphery of the turntable to assemble electrical components. A first part positioned in one of the workholders has the leading end of an insulated wir extending from a supply of wire welded thereto. The firs part is indexed without severing the wire extending from the first part to the supply, and a combined swaging and testing apparatus swages an upper rim of the first part. A portion of the wire extending to the first part in the workholder is separated from the supply while testing the weld of the wire to the first part and the new leading end of the wire is attached to the first part in the next succeeding workholder. Subsequently, the portion of the wire is wound on the first part, a second part is assembled to the first part and, the trailing portion of the wire is welded to a metal cap which is secured to the second part, and the strength of the weld is tested, whereafter the electrical component is tested electrically and then sorted.

2 Claims, 24 Drawing Figures

APPARATUS FOR FORMING AND TESTING ELECTRICAL COMPONENTS

CROSS-REFERENCE TO RELATED APPLICATION

This is a division of application Ser. No. 878,017, filed Nov. 19, 1969, now U.S. pat. No. 3,618,204, issued Nov. 9, 1971.

BACKGROUND OF THE INVENTION

1. Field of the Invention

This invention relates to apparatus for forming and testing electrical components and, more particularly, to apparatus for advancing successive ones of a mass of first parts on an indexable turntable through a plurality of work stations to join a leading end of a wire to each of the first parts and for then forming successive ones of the first parts while testing the joint between the wire and the associated ones of the first parts.

2. Description of the Prior Art

In the manufacturing of electrical components, first parts and second parts must be fabricated and assembled together. For example, in the manufacture of heat coils which are used in central offices in incoming telephone lines to ground out overload currents before these currents damage the equipment in the central office, a bared leading end of an insulated filamentary wire must have a portion thereof welded to a sleeve of a pin and sleeve subassembly and then the wire must be wound around the pin and sleeve subassembly. The trailing end of the wire must be stripped of insulation and welded to a metal cap attached to a plastic shell which has been positioned over the pin and sleeve subassembly.

In the past, many of the operations related to the assembly of these heat coils have been accomplished by hand. Needless to say, this has been a time consuming and expensive task. Clearly, with the large quantities of heat coils which are required in building and maintaining telephone systems, more sophisticated apparatus are in order for the mass production of heat coils.

To date, commercially available apparatus have been available which perform some of the steps required for the more efficient assembly of heat coils. Some of these apparatus include devices for feeding the pin and sleeve subassemblies successively and individually into workholders arranged about the periphery of an indexable turntable. The pin and sleeve subassemblies are formed, e.g., swaged in the workholders and, subsequently, individual ones of a mass of plastic shells having a metal cap secured to one end thereof are fed into engagement with and secured to individual ones of the pin and sleeve subassemblies. Moreover, these apparatus have also included devices for stripping initially a continuous insulated conductor wire from a supply thereof at spaced portions along the length thereof, the spaced portions coincide with the point of initial attachment of the wire to the sleeve of the pin and sleeve subassembly and to the point of subsequent attachment of the trailing end of the wire to the cap on the plastic shell. Facilities have also been provided for winding the wire on the pin and sleeve subassembly as the pin and sleeve subassemblies are advanced through the work stations spaced about the periphery of the turntable. Welding stations are provided in these apparatus for welding the leading and the trailing ends of each length of wire to the sleeve of the pin and sleeve subassembly and to the metal cap, respectively.

However, no facilities were provided in these apparatus for strength testing the weld of the leading end of the wire to the associated ones of the pin and sleeve subassemblies.

SUMMARY OF THE INVENTION

It is an object of this invention to provide new and improved methods of and apparatus for forming and testing automatically electrical components.

Still another object of this invention is to provide new and improved methods of and apparatus for testing the strength of a joint between a portion of a length of wire bonded to a part.

A yet still further object of this invention is to provide new and improved methods of and apparatus for positioning a wire extending from a supply in transverse engagement with a part to join the wire to the part and for forming the part while testing the wire at the joint and then orienting the part to wind automatically the wire on the part.

An apparatus for swaging a part and for testing a joint of a wire bonded to the part and extending transversely of the part and for severing the wire adjacent the joint includes facilities for holding the part, facilities movable longitudinally of the part transversely of the wire for swaging the part, testing facilities mounted pivotally on the movable facilities for engaging the wire adjacent to the joint and for imparting a force to the wire to test the joint and to break the wire immediately adjacent effective joints tested, facilities for moving the movable facilities and the testing facilities into engagement with the wire and the part and for then retracting the movable and testing facilities subsequent to the swaging and testing operation, and auxiliary facilities mounted pivotally on the movable facilities and operated where the movable facilities are retracted for cutting the wire at a point adjacent to but spaced from defective joints.

Other objects and features of the present invention will be more readily understood from the following detailed description of specific embodiments thereof when read in conjunction with the appended drawings, in which:

BRIEF DESCRIPTION OF THE DRAWINGS

FIG. 13 is an enlarged sectional view of a welding device of the apparatus of FIG. 2 taken along line 13—13 thereof;

FIG. 13 is an enlarged perspective view of a portion of a welding electrode of the welding device of FIG. 13;

DETAILED DESCRIPTION

Figure 1:
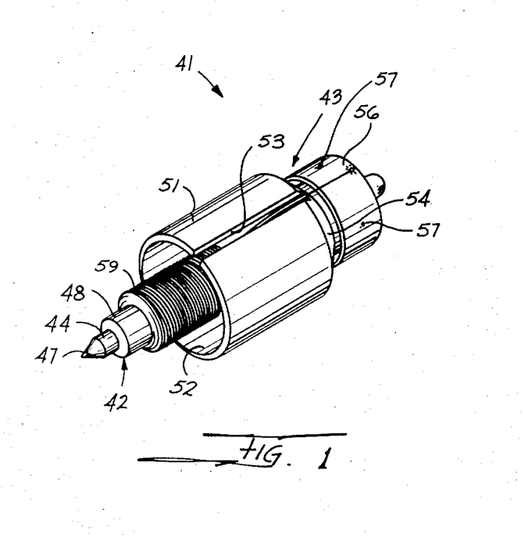
FIG. 1 is a perspective view of a heat coil showing a pin and sleeve subassembly which is formed and tested by the principles of the apparatus of this invention.
Figure 3:
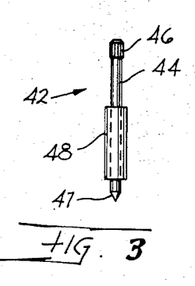
FIGS. 3 through 9 are a series of enlarged elevational views of the heat coil in various stages of assembly beginning with the pin and sleeve subassembly which is advanced through the work stations to have one end of a conductor wire welded thereto, then to have a shell and cap subassembly placed thereover and another end of the conductor wire welded to the cap of the shell and cap subassembly.
Figure 8:
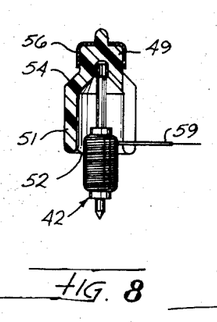

Referring now to FIG. 1, there is shown a heat coil assembly, designated generally by the numeral 41, which is to be assembled in part by apparatus of this invention. The heat coil assembly 41 includes a pin and sleeve subassembly 42 and a shell and cap subassembly 43. As can be seen in FIG. 3, the pin and sleeve subassembly 42 includes a pin 44 having a knurled end 46 and a pointed end 47. The pin 44 is soldered with a low melting temperature alloy, such as a bismuth mixture, in a sleeve 48 with the pointed end 47 protruding slightly from one end of the sleeve. The knurled end 46 extends some distance from the other end of the sleeve 48. Each of a mass of the pin and sleeve subassemblies 42—42 is assembled with one of a mass of the shell and cap subassemblies 43—43 so that the knurled end 46 is received in a recess in a closed end 49 (see FIG. 8) of a housing or shell 51.

The shell 51 is cylindrically shaped, having an open end 52 at one end thereof, and may be constructed of any suitable material, such as a plastic. The shell 51 is also formed with a slot 53 parallel with the longitudinal axis of the shell. The other closed end 49 of the plastic housing 51 has a beveled portion 54 which connects the cylindrical portion of the housing with the closed end. Moreover, a solder-plated brass cap 56 is received over the closed end 49 and is attached to the plastic shell 51 by protrusions 57 in the cap being received in indentations in the shell 51 (see FIG. 1).

Figure 4:
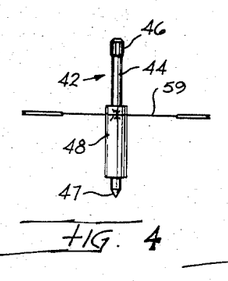
Figure 5:
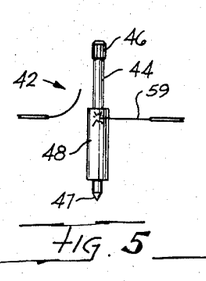
Figure 6:
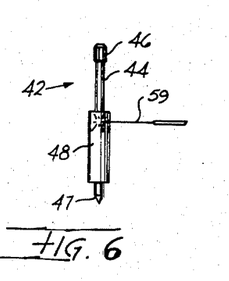
Figure 7:
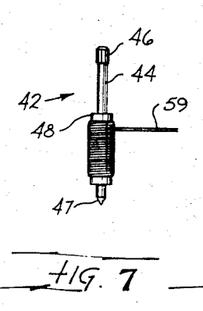

Prior to the assembly of the pin and sleeve subassembly 42 with the shell and cap subassembly 43, one end of an insulated conductor wire 59 extending from a supply has the insulation removed therefrom and is welded to the sleeve 48 of the pin and sleeve subassembly (see FIG. 4). Then a portion of the wire 59 extending to the pin and sleeve subassembly 42 is severed (see FIG. 5) from the supply and the new leading end of the wire is attached to the pin and sleeve subassembly in the next succeeding workholder while maintaining the trailing part of the wire taut, and an upper rim of the sleeve 48 is swaged (see FIG. 6). The pin and sleeve subassembly and the workholder are rotated and an insulated portion of the conductor wire 59 is wound around the sleeve 48 (see FIG. 7). Subsequently, the insulation is removed from another portion of the length of wire and one of the pin and sleeve subassemblies 42—42 is assembled with the shell and cap subassembly 43 with the knurled end 46 received in the closed end 49 and with the other unwound part of the conductor wire extending through the slot 53 in the shell 51 (see FIG. 7). Then, the portion of the conductor wire 59 is welded to the cap 56 (see FIG. 8), after which the strength of the weld of the wire to the cap is tested. Then the heat coil assembly 41 is moved to a final station where an electrical characteristic of the heat coil assembly is determined and then the heat coil assembly is sorted in accordance with the test characteristic.

General Over-all Description of the Apparatus

Figure 9:
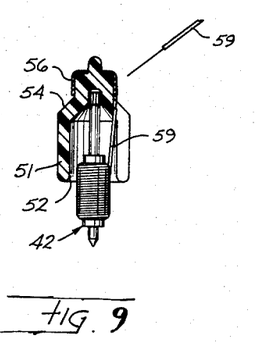

An apparatus, designated generally by the numeral 60 (see FIG. 2), for carrying out the principles of this invention includes a turntable 61 which is mounted rotatably on a base 62 (see FIG. 10) and which has a plurality of work stations arrayed about the periphery thereof. Moreover, the turntable 61 also has a plurality of workholders 63—63 attached to the turntable around the periphery thereof. At a first station (station No. 1, FIG. 2), a feeding device, designated generally by the numeral 100, (see FIG. 10), feeds successive ones of a mass of the pin and sleeve subassemblies 41—42 (see FIG. 3) into successive ones of the workholders 63—63. Then a leading one of the workholders 63—63 is moved with the turntable 61 to a second work station (station No. 2, FIG. 2) where a stripping blade 141 (see FIG. 12) strips a leading end of the insulated wire 59 and a welding device 150 (see FIG. 13) welds the bared leading end to the sleeve 48 (see FIG. 4) of the pin and sleeve subassembly 42. The conductor wire 59 may, for example, have a copper-nickel-zinc composition. As the turntable 61 is moved rotatably into a third work station (station No. 3, FIG. 2), the wire 59 extends from the pin and sleeve subassembly 42 to a supply 64 of the wire. At the third work station a combined swaging and testing device, designated generally by the numeral 180 (see FIG. 18), turns an upper rim of the sleeve 48 inwardly (see FIG. 6). After the rim of the sleeve 48 has been swaged, the testing facilities of the device 160 tests the weld of the wire to the sleeve assembly 42. For acceptable joints, the device 160 severs a length of the wire 59 extending to the pin and sleeve subassembly 42 (see FIG. 5) in the workholder 63 from the supply 64 with the new leading end of the wire 59 attached to the sleeve 48 of the pin and sleeve subassembly 42 in the next succeeding workholder 63. The pin and sleeve subassembly 42 is rotated to wind the length of wire 59 on the sleeve 48 (see FIG. 7) while tensioning the length of wire extending from and secured to the pin and sleeve subassembly 42. As the wire 59 is wound on the sleeve 48, the workholder 63 is advanced with the turntable 61 where a shell subassembly feeding and assembly device, designated generally by the numeral 200 (see FIG. 2), removes the insulation from a portion of the wire extending from the pin and sleeve subassembly 42, (see FIG. 7), and where a plastic shell 51 is placed over the knurled end 46 of the pin and sleeve subassembly 42 (see FIG. 8). Then the heat coil assembly 41 is moved to a next work station whereat a welding device, designated generally by the numeral 230 (see FIG. 2), welds the portion of the wires 59 to the cap 56 (see FIG. 9) whereafter the strength of the weld to the cap is tested. Finally, the turntable 61 is indexed to position the heat coil assembly 41 at a final work station (station No. 8, FIG. 2) where a testing and sorting device, designated generally by the numeral 240, determines an electrical test characteristic of the heat coil assembly, after which the heat coil assembly is ejected therefrom and sorted in accordance with the test characteristic.

Conveyor

Figure 2:
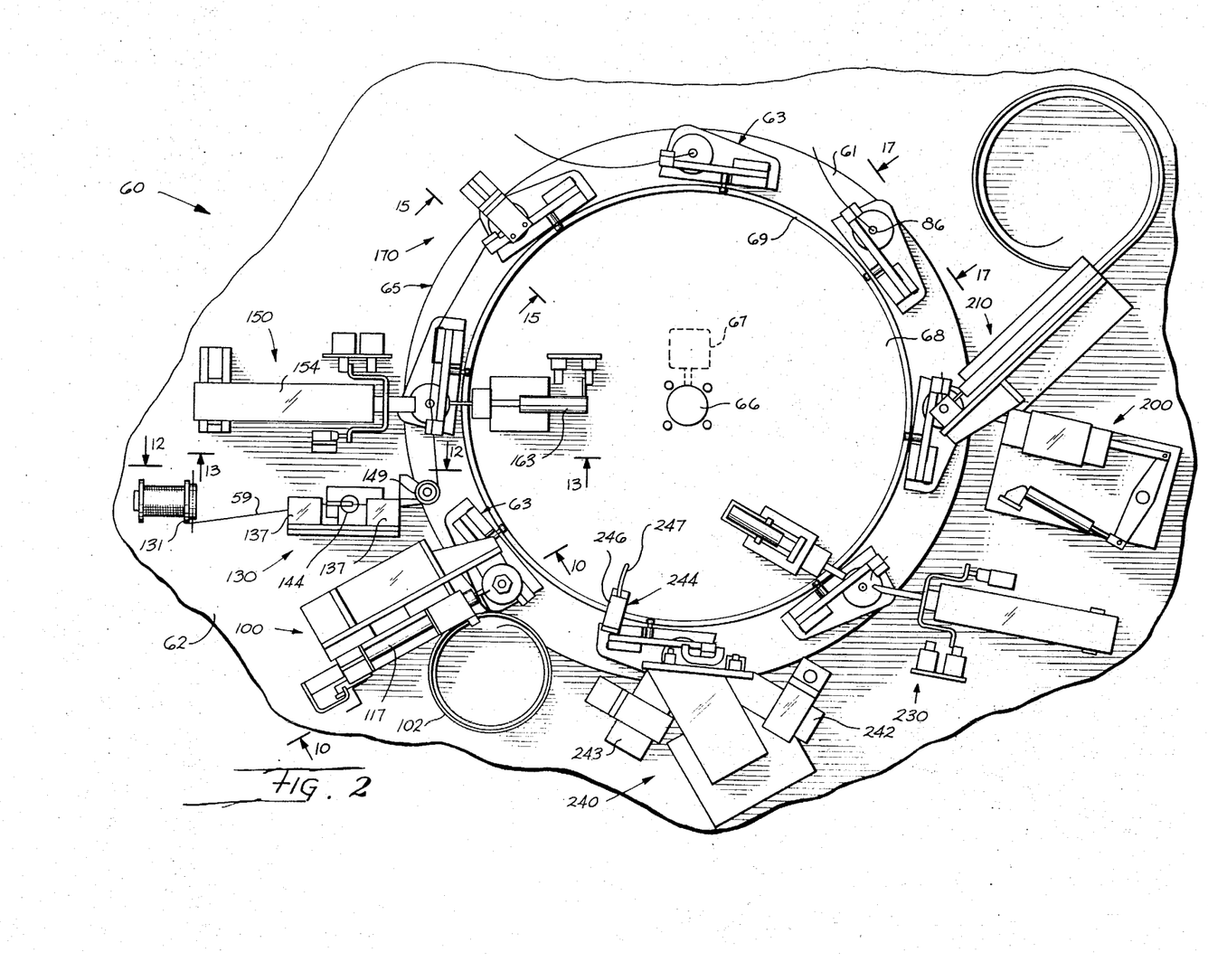
FIG. 2 is a plan view of an apparatus which embodies certain principles of this invention which includes a rotatably mounted circular turntable having a plurality of workholders arrayed about the circumferential edge thereof for advancing each of the workholders successively through each of a plurality of work stations for assembling a pin and sleeve subassembly with a shell and cap subassembly to assemble a heat coil.

Referring now to FIG. 2, there is shown a conveyor, designated generally by the numeral 65, which includes the turntable 61. The turntable 61 is secured to a shaft 66 and is moved rotatably with the shaft intermittently and successively in a clockwise direction, as viewed in FIG. 2, to index the turntable through each of a plurality of work stations by a continuously operated drive motor 67 (see FIG. 2). The turntable 61 is mounted on the shaft 66 so that the turntable is spaced from the base 62 (see FIG. 10). Moreover, a stationary, circular top worktool platform 68 is mounted on the base 62 and is concentric with the turntable 61 (see also FIG. 13). However, the circular top platform 68 has a diameter somewhat smaller than the diameter of the turntable 61. In this way, a plurality of the workholders 63—63 may be mounted on and individually attached to the turntable 61 and arrayed about the periphery thereof. Then, at each of the plurality of work stations, a plurality of work devices which are used to assemble the heat coil assemblies 41—41 may be attached to the circular top platform 68 and to the base plate 62, and may cooperate to perform work functions on the workpieces in the workholders which are positioned on the turntable 61 in the space therebetween.

The top of the platform 68 has an annular cam surface 69 (see FIGS. 2 and 13) concentric with the platform and adjacent the peripheral edge of the platform. The annular cam surface 69 has a height ($h$) (see FIG. 13) which varies along the circumference thereof to present a contoured or cam surface which is used in the winding operation of the wire 59 to distribute the wire on the pin and sleeve subassembly 42 and which will be hereinafter described in detail.

Figure 17:
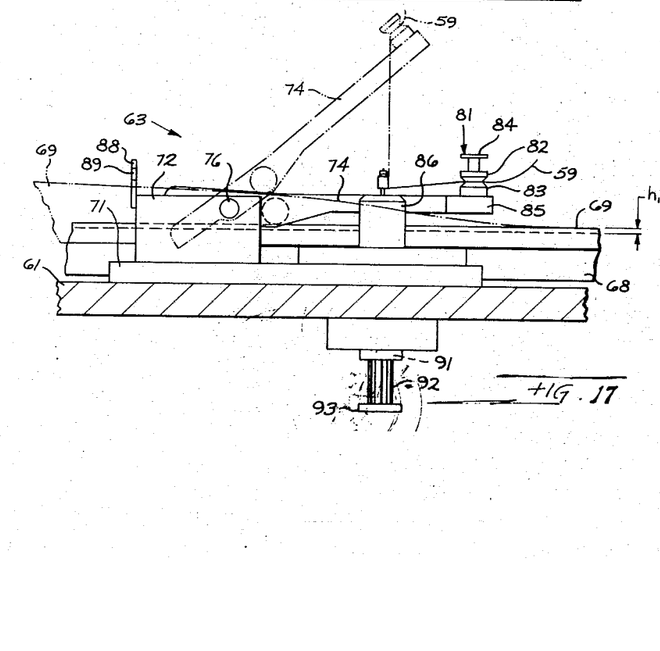
FIG. 17 is an enlarged elevational view of one of the workholders of the apparatus of FIG. 2 taken along line 17—17 thereof and illustrating the upward movement of the distributor arm on the workholder to push a portion of the wire extending from the pin and sleeve subassembly in approximate engagement with the cap of the shell and cap subassembly assembled to the pin and sleeve subassembly which is positioned in the workholder to facilitate welding of the wire to the cap.

Referring now to FIGS. 2 and 17, it can be seen that each of the workholders 63—63 includes a base plate 71 having a block 72 attached thereto at one end. The block 72 has a longitudinal channel 73 formed therethrough for receiving one end of a distributor arm 74. The distributor arm 74 is pivotally mounted at one end thereof to the block 72 by a pin 76 with the end of the distributor arm extending from the channel 73 in a direction opposite to the clockwise rotary movement of the turntable 61.

The distributor arm 74 is assembled with a protruding portion 77 which extends radially inwardly from the distributor arm toward the top circular platform 68. A cam follower 78 is mounted rotatably on the protruding portion 77 and engages the annular cam surface 69 of the top circular platform 68. In this way, the cam follower 78 supports the unpinned other end of the distributor arm 74 and, as the turntable 61 is moved rotatably about the stationary platform 68, the can follower rides on the cam surface 69 to move pivotally the distributor arm 74 in accordance with the configuration of the cam surface.

Moreover, the unpinned other end of the distributor arm 76 is equipped with a tensioning device 81 (see FIG. 17) for receiving and tensioning the wire 59. The tensioning device 81 includes a stud 82 having a threading groove in which the wire 59 is received with the stud 82 positioned between the distributor arm 74 and an overlying bracket 83. A spring mounted screw 84 extends through the bracket 83 and the stud 82 and into the distributor arm 74 in order to mount the stud and to adjust the compressive force between the stud 82 and a boss 85 of the distributor arm. The tightening of the screw 84 increases the clamping effect of the stud 82 on the wire 59 in the groove to tension the wire.

Figure 15:
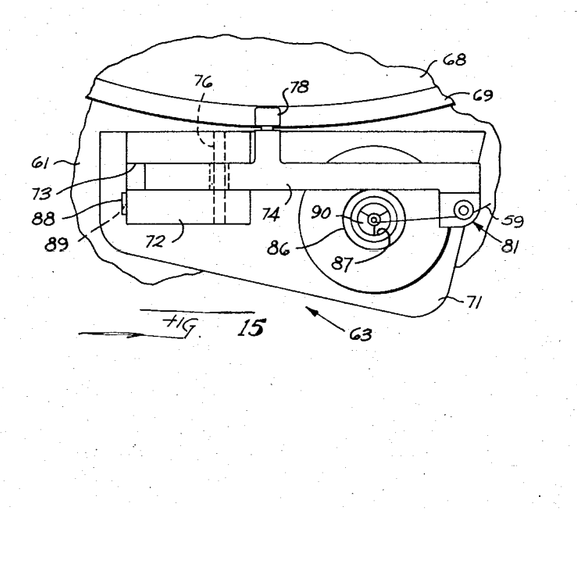
FIG. 15 is an enlarged plan view of one of the workholders which is arrayed about the circumferential peripheral edge of the turntable and having a pivotally mounted arm for distributing the wire around the sleeve of a pin and sleeve subassembly as the arm is moved pivotally by a cam follower which rides on a contoured cam surface on a platform.

Each of the workholders 63—63 includes a guide 88 having V-shaped opening 89 and mounted on a leading end of the block 72 (see FIG. 15). As can best be seen in FIG. 2, the stud 82, a chuck 86 and the guide 88 are arranged on the workholder 63 so that the length of the wire 59 strung between the V-shaped opening 89 and engaging the stud 82 is substantially linear and engages the top portion of the circumferential surface of the sleeve 48 of the pin and sleeve subassembly 42 held in the chuck 86 (see also FIG. 4).

In order to hold one of the pin and sleeve subassemblies 42—42, the chuck 86 having a housing 78 is positioned on the base plate 71 of the workholder 63 between the threading 81 of the distributor arm 74 and the block 72. The chuck 86 has an opening formed between a plurality of jaws 90—90 (see FIG. 15) for receiving the pointed end 47 of the pin 44 and for holding the pin in an upright position with the knurled end 46 extending upwardly. The jaws 90—90 are attached to a shaft 91 which extends downwardly through an opening in the turntable 61 and which is spring biased in an upward direction. In this way, the jaws 90—90 are normally biased upwardly to cam against the wall of the opening in the housing 87 of the chuck 86 to maintain the jaws in a closed position. As the shaft 91 is moved downwardly, the jaws 90—90 are drawn downwardly and are cammed against the wall of the housing 87 to open the jaws to permit insertion of a pin and sleeve subassembly 42.

The chuck 86 of the workholder 63 is also secured to the shaft 91 (see FIGS. 10 and 17) which is mounted rotatably through the base plate 71 and the turntable 61 in order to move rotatably the pin and sleeve subassembly 42 held on the chuck to wind the wire 59 on the sleeve 48. The shaft 91 has a pinion 92 formed on the lower end thereof and has a collar 93 attached thereto just below the lower end of the pinion 92. The pinion 92 is designed to mesh with a rack 94 (see FIG. 16) mounted to the base 62 of the apparatus 60. As the turntable 61 is indexed, the pinion 92 engages with the rack 94 to turn the shaft 91 and rotate the chuck 86 and the pin and sleeve subassembly 42 which is held between the jaws 90-90 of the chuck. In order to distribute the wire 59 vertically around the sleeve 48, the cam follower 78 of the distributor arm 74 rides on the contour of the annular cam surface 69 (see FIG. 17) to move pivotally the distributor arm about the pin 76 to distribute the wire on the pin and sleeve subassembly 42 which is rotated with the chuck 86 by the cooperation between the pinion 92 and the rack 94.

Pin and Sleeve Subassembly Feeding Station

Figure 10:
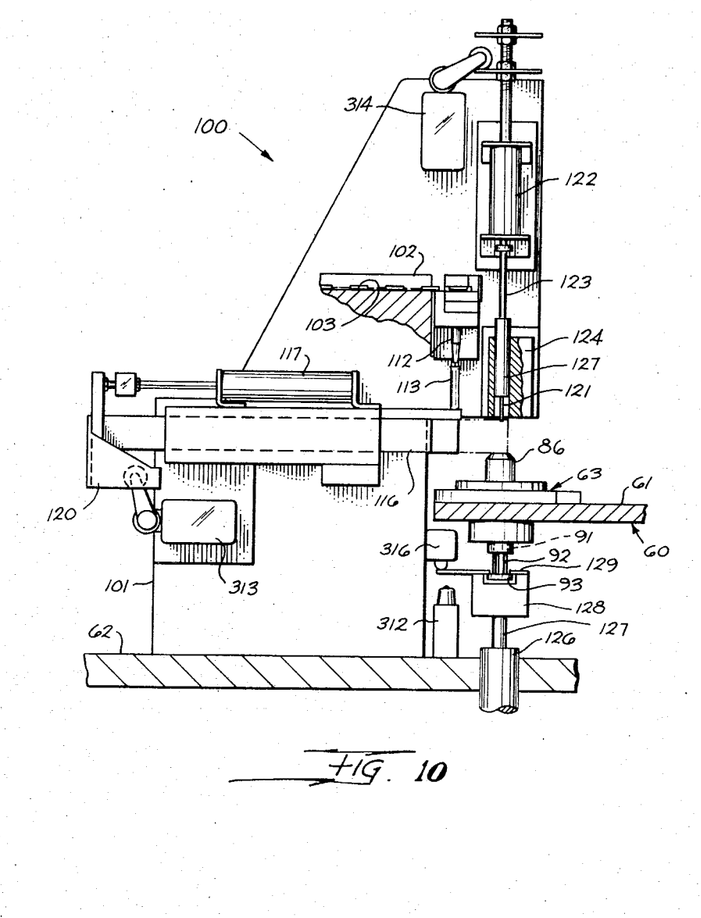
FIG. 10 is an enlarged sectional view of a pin and sleeve subassembly feed device of the apparatus of FIG. 2 taken along line 10—10 thereof with portions broken away for pusposes of clarity.
Figure 11:
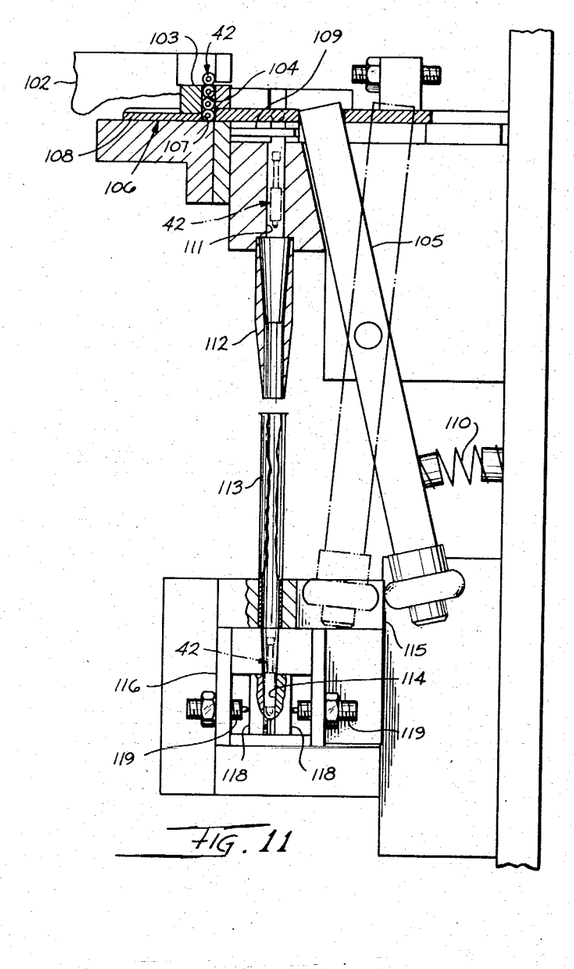
FIG. 11 is an enlarged detailed view of the pin and sleeve subassembly feed device of FIG. 10 showing the movement of successive pin and sleeve subassemblies from a vibratory bowl feeder to a placement slide for pushing the pin and sleeve subassemblies over the workholder in registration with that station.

Referring now to FIGS. 2, 10 and 11, there is shown the pin and sleeve subassembly feeding device 100 for feeding successive ones of a mass of the pin and sleeve subassemblies 42—42 into successive ones of the chucks 86-86 of the workholders 63—63 which are spaced around the periphery of the turntable 61. The pin and sleeve subassembly feeding device 100 includes a frame 101 which is mounted on the base 62 of the apparatus 60 and also includes any commercially available vibratory bowl feeder 102 which may be adapted for use in the apparatus 60. The vibratory bowl feeder 102 is operated to move the pin and sleeve subassemblies 42—42 from within the bowl along a ledge 103 and to advance the pin and sleeve subassemblies to a feed opening 104 formed in the ledge. As can be seen in FIG. 11, the feed opening 104 in adapted to receive a plurality of the pin and sleeve subassemblies 42—42.

The opening 104 overlies a reciprocally movable slide 106 which is moved radially outward from the turntable 61 toward the bowl feeder 102 so that a receiving slot 107 in the slide receives the leading one of the pin and sleeve subassemblies 42—42 which has been advanced along the ledge 103 and into the opening by the vibratory forces imparted the bowl feeder. Then, the slide 106 is moved radially inward of the turntable 61 away from the bowl feeder 102 so that a solid portion 108 of the slide now underlies the opening 104 and supports the remaining pin and sleeve subassemblies 42—42 in the opening. Moreover, the slide 106 is separated physically from the bowl feeder 102 so that the vibrations of the bowl feeder are not imparted to the slide, which vibrations may unduly affect the operation of the slide in feeding the pin and sleeve subassemblies 42—42 to the workholder 63. After the slide 106 has received a leading one of the pin and sleeve subassemblies 42—42 in the receiving slot 107 and is moved away from the bowl feeder 102, the receiving slot is positioned over a pin 109 (see FIG. 11).

The pin 109 is used to orient the pin and sleeve subassemblies 42—42 for subsequent movement into one of the chucks 86—86 on one of the workholders 63-63 in registration with the feeding device 100. The pin 109 is mounted transversely of the receiving slot 107 so that as each of the pin and sleeve subassemblies 42—42 is advanced by the slide 106 away from the opening 104, the pin and sleeve subassemblies are moved individually over and spaced above the pin, whereupon the pin and sleeve subassemblies drop vertically by gravity and come to rest on the pin.

The pin 109 is positioned beneath the right hand location of the receiving slot 107, as viewed in FIG. 11, so that regardless of the longitudinal orientation of the pin and sleeve subassembly 42 within the receiving slot, the pin and sleeve subassembly pivots about the pin so that the pointed end 47 of the pin 44 is always oriented downwardly. Because of the construction of the pin and sleeve subassembly 42, the center of gravity is somewhere within the sleeve section 48. If the pin and sleeve subassembly 42 is fed with the pointed end 47 forward (as related to line of advancement along the ledge 103 of the bowl feeder 102), the pin and sleeve subassembly comes to rest on the pin 109 so that the heavier sleeve 48 drops vertically downward first through a passage 111 and then into and through a chute 112, into a funnel 113 and into a nest 114 formed in a second slide 116 (see FIGS. 10 and 11).

The second slide 116 is reciprocally movable by an air cylinder 117 (see FIG. 10) so that as each of the successive ones of the pin and sleeve subassemblies 42—42 is received in the nest 114 in the second slide, the slide is moved by the air cylinder radially inward toward the turntable 61 to position successively each of the pin and sleeve subassemblies over one of the chucks 86—86 of the workholders 63—63 currently in position under the feeding device 100. Moreover, the next 114 in the slide 116 is formed between a pair of opposed resilient fingers 118—118 (see FIG. 11) which are biased inwardly toward each other by a pair of opposed adjustably settable lugs 119 to clamp one of the pin and sleeve subassemblies 42—42 therebetween.

As can best be seen in FIGS. 10 and 11, the slide 116 is formed with one end having tapered camming surfaces 115-115 which are used to control the escapement of the pin and sleeve subassemblies 42—42 from the slide 106 into the opening 111. Normally, the slide 106 is biased to the right, as viewed in FIG. 11, by a pivotally mounted rod 105 which has one end protruding into an opening in the slide and which has the other end urged in a clockwise direction, as viewed in FIG. 11, and into engagement with one of the camming surfaces 115—115 by a compression spring 110. When the slide 116 is moved to position the pin and sleeve subassembly 42 held in the nest 114 thereof over one of the chucks 86—86, one of the camming surfaces 115-115 is cammed against the lower follower end of the rod 105 to move pivotally the rod in a counterclockwise direction, as viewed in FIG. 11, to move the slide 106 to the left to align the receiving slot 107 with the opening 104. The alignment of the receiving slot 107 with the opening 104 permits the lowermost one of the pin and sleeve subassemblies 42—42 to drop into the receiving slot with the remaining pin and sleeve subassemblies supported on the pin and sleeve subassembly in the receiving slot. Then, when the slide 116 is moved retractably away from the chuck 86, the follower end of the rod 105 rides along one of the tapered camming surfaces 115—115 to permit the spring 110 to urge the rod in a clockwise direction. As the rod 105 is moved in a clockwise direction, the slide 106 is advanced to the right, as viewed in FIG. 11, to align the receiving slot 107 with the opening 111 and to allow the pin and sleeve subassembly to drop downwardly into engagement with the pin 109 and then into the chute 112.

As the slide 116 is moved over the chuck 86 of the workholder 71, currently positioned in registration with the feeding device 100, an air operated plunger 121 is moved downwardly by an air cylinder 122, acting through a rod 123 slidably secured in a sleeve 124. The plunger 121 imparts a pushing force to the pin and sleeve subassembly 42 and thereupon moved the fingers 118—118 away from one another as the plunger continues to move downwardly and push the pin and sleeve subassembly through the nest 114 in the slide 116 and into the chuck 86 with the knurled end 46 of the pin 44 oriented upwardly (see FIG. 3). Simultaneously therewith, an air cylinder 126 is actuated to move a piston rod 127 and a block 128 downwardly, as viewed in FIG. 10, to impart a pulling force through a plate 129 against the collar 93 to move the shaft 91 downwardly. As the shaft 91 is moved downwardly, the jaws 90-90 in the chuck 86 are opened to permit the pin and sleeve subassembly 42 to be received in the opening therebetween.

Wire Feeding and Welding Station

The pin and sleeve subassembly 42 in a leading one of the workholders 63—63 is indexed into a second work station of the apparatus 60 whereat a wire feeding and a welding device, designated generally by the numerals 130 and 150, respectively, (see FIG. 2), removes the insulation from a leading end of an insulated wire 59 and then welds the leading bared end to a top circumferential portion of the sleeve 48 of the pin and sleeve subassembly.

Figure 12:
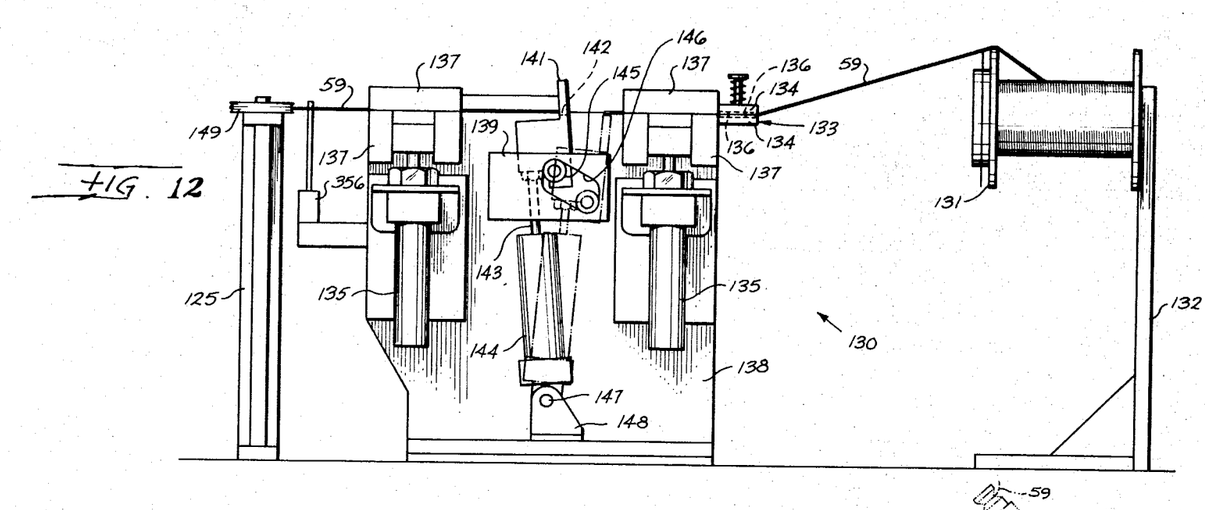
FIG. 12 is an enlarged sectional view of a conductor wire feeding station of the apparatus of FIG. 2 taken along line 12—12 thereof illustrating the conductor wire being payed out from a supply spool and advanced through a stripping device wherein predetermined portions of the conductor wire are bared of the insulation.

Referring now to FIG. 12, there is shown the wire feeding and stripping device 130 at the second work station which includes a spool 131 of the fine gauge, e.g. 0.007 inch insulated wire 59. The spool 131 of wire 59 is mounted for rotation on a stanchion 132 and is payed out so that the convolutions of wire are moved over one of the flanges of the spool. The insulated wire 59 is advanced through a spring-loaded guide block 133 having a pair of plates 134–134, each of which has a groove 136 formed therebetween for receiving the wire. The wire 59 is then advanced under a pair of spaced hold-down bars 137–137. The hold-down bars 137–137 are attached to and extend from a vertical plate 138 which is mounted on the base plate 62 of the apparatus 60.

In order to strip spaced portions of the continuous insulated wire 59 for subsequent welding of the wire to the sleeve 48 of each of the pin and sleeve subassemblies 42–42, a stripping blade 141 is provided. The stripping blade 141 has a tapered edge with a U-shaped groove 142 formed therein to facilitate the reception of the wire 59. Moreover, the blade 141 is mounted on a rod 143 which extends from a cylinder 144. The rod 143 has a cam follower 145 extending externally therefrom for following a cam opening 146 in a plate 139 attached to the vertical plate 138. The cylinder 144 has one end thereof pivotally mounted on a pin 147 supported in a bearing 148. In this way, the stripping blade 141 is mounted for vertical movement as well as for horizontal movement.

As the wire 59 is advanced under the hold-down bars 137–137, the stripping blade 141 is actuated to move the blade upwardly and into engagement with the insulated wire in the groove 136. Then, the stripping blade 141 is moved in the direction of advancement of the wire 59 to strip a predetermined portion "L" (see FIGS. 4 and 12) from the wire. The wire 59 is then advanced continuously around a guide sheave 149 which is rotatably mounted on a mounting bracket 135 attached to the base 62 of the apparatus 60. The sheave 149 is positioned so that the wire 59 is pulled over the sheave and then through the groove between the stud 82 and the distributor arm 74 (see FIG. 2) and then through the guide 88.

The predetermined length of bared wire "L" is spaced along the continuous length of the wire 59 so that, as each of the chucks 86 on the workholders 63—63 is advanced into registration with the welding device 150, one of the predetermined lengths "L" of bared wire is in engagement with the top portion of the sleeve 48 of the pin and sleeve subassembly 42 held in the workholder 63 currently in registration with the welding device (see FIG. 4).

The welding device 150 is disposed in a clockwise direction from the guide sheave 149, as viewed in FIG. 1, and includes an anvil electrode 151 and a welding electrode 152 which are spaced apart and which are movable into engagement with the pin and sleeve subassembly 42 and with the bared exposed portion "L" of the wire 59. As the electrodes 151 and 152 engage the sleeve 48 and press the bared portion "L" of the wire 59 against the sleeve 48, the welding device is operated to secure the bared portion of the sleeve 48.

Figures 13, 13A:
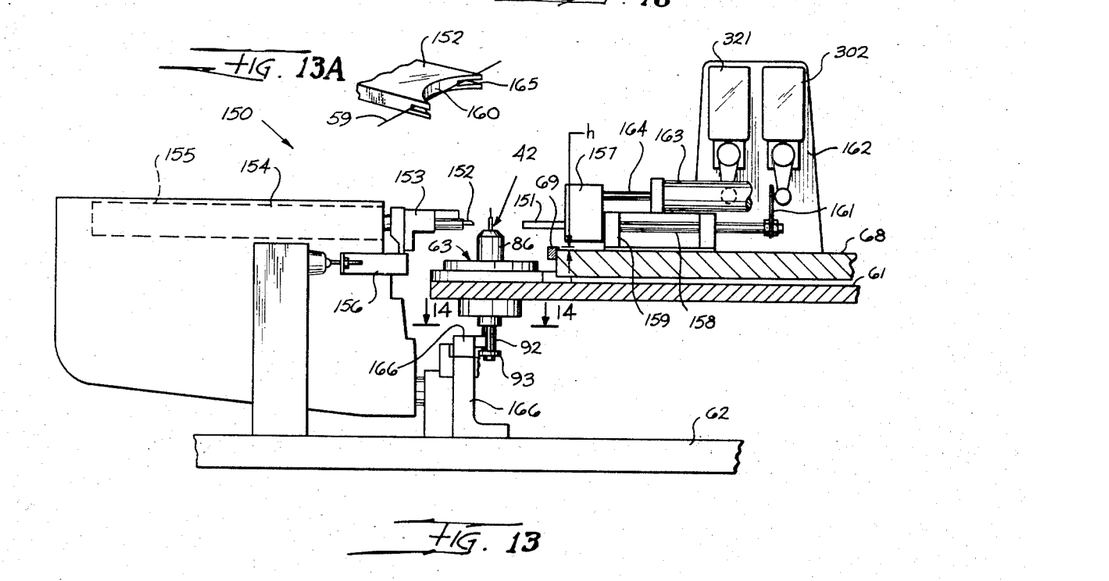

As can best be seen in FIGS. 2 and 13, the welding electrode 152 is mounted on a carriage 153 which is slidably mounted in a housing 154 on the base 62. The carriage 153 is moved slidably inward the turntable 61 by an air cylinder 155 to engage the welding electrode 152 with the bared length "L" of the wire 59. The carriage 153 also has a bracket 156 extending rearwardly therefrom along a radial line from the center of the turntable 61 for actuating a limit switch 377 and a limit switch 378 which are used in controlling the operation of the apparatus 60.

The welding electrode 152 is formed to facilitate engaging the wire 59 between the welding electrode and the sleeve and to align vertically the wire on the sleeve 48. In order to accomplish these functions, the welding electrode 152 has a thickness, measured along a vertical axis, as viewed in FIG. 13, slightly less than twice the thickness of the wire 59. Moreover, the end of the welding electrode is formed with a concave surface 160 (see FIG. 13A) for receiving the sleeve 48 of the pin and sleeve subassembly 42. The concave surface 160 has a pair of aligned slots 165–165 extending transversely of the concave surface thereof. As the welding electrode 152 is moved radially inward of the turntable 61, the wire 59 is received in the spaced slots 165–165 and moved into engagement with the sleeve 48 and the concave surface 160.

Referring again to FIG. 13, it can be seen that the anvil electrode 151 is attached to a carriage 157 having a rod 158 which is mounted slidably in a pair of spaced bearings 159–159 that are supported on the platform 68. One end of the rod 158 has a vertically upstanding actuator plate 161 for actuating either of a pair of spaced limit switches 321 and 302 (see also FIG. 23) for controlling the operation of the apparatus 60. The limit switches 321 and 302 are attached to a mounting plate 162 which is secured to the platform 68. In order to move the anvil electrode 151 radially of the turntable 61 and slidably into engagement with the sleeve 48 of the pin and sleeve subassembly 42 in registration with the welding device 150, an air cylinder 163 has a piston rod 164 attached to the carriage 157.

Figure 14:
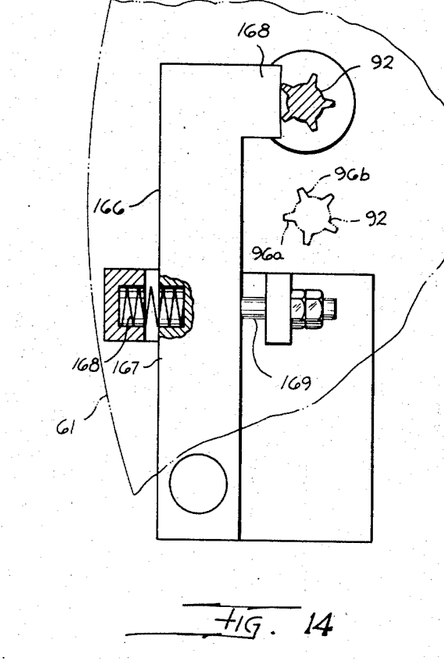
FIG. 14 is an enlarged sectional view of the welding station of FIG. 13 taken along line 14—14 thereof which illustrates a pinion orienter located on the underside of the turntable at the welding station for orienting the pinion attached to a shaft extending from below the workholder and which engages subsequently a rack for turning the workholder and the pin and sleeve subassembly held therein to facilitate winding the wire on the sleeve of the pin and sleeve subassembly.

Moreover, the second work station which includes the wire feeding and stripping device 130 and the welding device 150 also includes a pinion orienter 166, (see FIG. 14). The pinion orienter 166 is mounted on the base plate 62 of the apparatus 60 in alignment with the welding device 150. It has been noted hereinbefore that each of the chucks 86–86 has a shaft 91 depending downwardly therefrom with a pinion 92 and a collar 93 secured to a lower end thereof. In order for the gear teeth 96–96 of the pinion 92 to engage correctly with the rack 94 at a subsequent station in order to rotate the chuck 86 and the pin and sleeve subassembly 42 held therein, it is necessary that the shaft 91 be oriented so that a leading one 96 of the gear teeth 96–96 of the pinion will correctly engage the rack teeth of the rack 94. Should the pinion 92 be oriented incorrectly, the gear teeth 96-96 may jam against the pinion with the rack.

As can best be seen in FIG. 14, the pinion orienter 166 includes a pivotally mounted lever arm 167 having a bossed end 168. Moreover, the lever arm 167 is normally biased in a clockwise direction, as viewed in FIG. 14, by a spring 168 into engagement with an adjustably settable stud bolt 169. As the turntable 61 is moved indexably to position one of the workholders 63–63 in registration with the welding device 150 then, should the pinion 92 associated with that particular workholder 63 be oriented properly, the gear teeth 96–96 on the pinion 92 are spaced and simply moved slidably along the surface of the bossed end 168 (see FIG. 14). However, should one of the teeth 96–96 of the pinion 92, which is farthest from the center of of the turntable 61, be oriented in a direction along the radius of the turntable (see tooth 96a of the pinion 92 shown in broken lines, FIG. 14), then the tooth 96a engages the edge of the bossed end 168 to rotate slightly the pinion, the shaft 91 and the chuck 86 in a counterclockwise direction, as viewed in FIG. 14, until the next adjacent tooth (tooth 96b, FIG. 14) slides along the surface of the bossed end. The orientation of the pinion 92 is accomplished just prior to the welding of the wire 59 to the sleeve 48.

Combined Severing and Swaging Station

Figure 18:
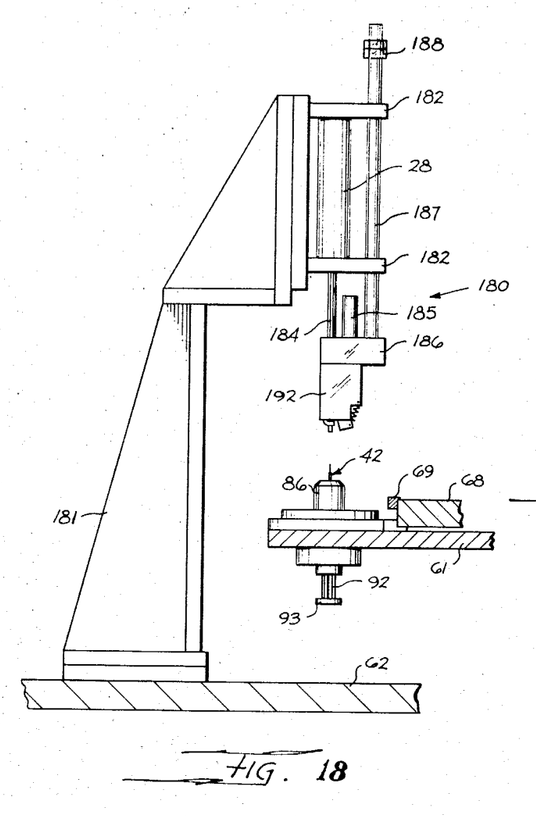
FIG. 18 is an enlarged sectional view of a combined cutting and swaging station which may be used in place of the separate cutting and swaging stations used in the past and which embodies certain principles of this invention.

In accordance with the principles of this invention, the apparatus includes a combined swaging and testing device, designated generally by the numeral 180 (see FIG. 18). The combined cutting and swaging device 180 includes a stand 181 which is supported on the base 62. The stand 181 includes a pair of spaced, antilevered arms 182-182 for holding an air cylinder 183 therebetween. The air cylinder 183 has a piston rod 184 extending downwardly therefrom and secured rigidly to a tool block 186. Moreover, the tool block 186 is also secured to one end of a rod 187 which is slidably mounted in openings in the spaced arms 182–182 and which has a collar 188 attached to an upper end thereof for limiting the descent of the rod.

Figure 19:
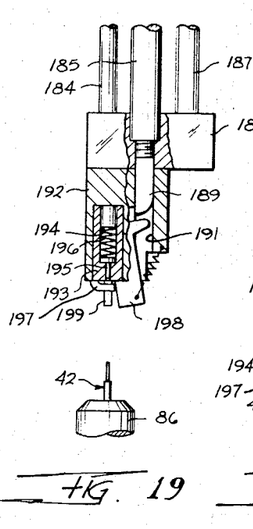
FIGS. 19 through 21 are a series of enlarged elevational views and showing the combined cutting and swaging station at various stages in severing the wire and swaging the sleeve of the pin and sleeve subassembly.
Figure 20:
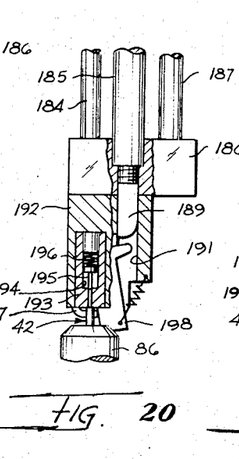
Figure 21:
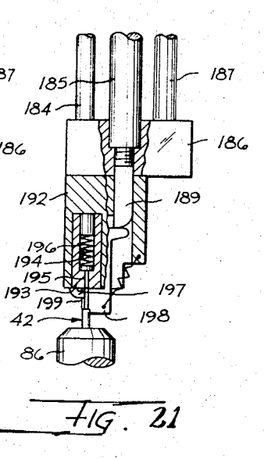

The construction of the cutting and severing device 180 can be further described by referring to FIG. 19 where it is seen that an air cylinder 185 is mounted on the tool block 186 and is connected to an actuator ram 189. The actuator ram 189 is mounted slidably in a bore 191 of a tool holder 192 with the bore 191 off-center from the vertical center line of the chuck 86 currently in registration with the severing and swaging station. As can best be seen in FIG. 19, the tool holder 192 includes a swaging tool 193. The swaging tool 193 has a beveled opening formed in the lower portion thereof for receiving the top rim portions of the sleeve 48 of the pin and sleeve subassembly 42 held in the chuck 86.

The air cylinder 183 is actuated and swaging tool 193 is moved downwardly until the collar 198 engages the top one of the arms 182–182 whereupon the pin 44 is received in a stepped bore 194 and urges a headed seating pin 195, which is biased downwardly normally by a spring 196, upwardly within the bore. Moreover, a member 197 which is rigidly attached to the underside of the tool holder 192 engages the wire 59 immediately adjacent the joint of the wire and the sleeve 48. If the weld of the wire 59 to the sleeve 48 is acceptable, the member 197 breaks the wire immediately adjacent the joint. The breaking of the wire 59 immediately adjacent the joint on the sleeve 48 eliminates any possible shorting-out problem which may occur when the use of thee cutting blades 171–171 to sever the wire 59 leaves a short portion of the wire extending beyond the joint.

Figure 22:
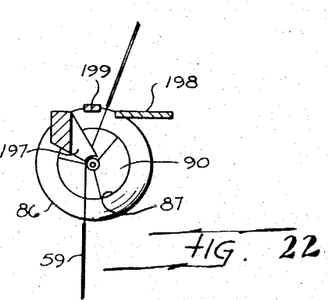
FIG. 22 is an enlarged view showing the relative positions of the pin and sleeve subassembly, the conductor wire, a movable and a stationary cutting blade and a wire breaking member at the combined cutting and swaging station.

The air cylinder 185 is also operated so that as the tool block 186 is being retracted the cylinder rod 185 moves the ram 189 into engagement with a pivotally mounted cutting blade 198 which is normally spring biased in a counterclockwise direction, as viewed in FIG. 19. As the cutting blade 198 is moved pivotally in a clockwise direction, the cutting blade cooperates with a cutting blade 199 which is rigidly attached to the tool block 186 (see FIGS. 19 and 22). If the joint is effective and the wire 59 broken by the member 197, the trailing end of the preceding length of wire moves out from between the blades 198 and 200, and although the blade 198 is actuated, the blades do not sever the wire. If the joint is defective, the blades 198 and 199 cut the wire 59 at the joint adjacent to, but spaced from the defective joint.

As the tool block 186 is moved upwardly, there is a tendency for the pin and sleeve subassembly 42 to be retained in the stepped bore 194 and pulled out of the chuck 86. To overcome this, the headed seating pin 195 is urged downwardly by the spring 196 in the bore 194 to impart a pushing force thereto to eject the pin and sleeve assembly 42 and to maintain the pin 44 seated in the chuck 86 and avoid undue stresses in the pin and sleeve subassembly.

Wire Winding

The rack 94 is positioned on the base 62 so that the pinion 92 on the shaft 91 of each of the workholders 63-63 engages initially the teeth of the rack when the workholder is moved out os registration with the swaging device 180. After the tim of the sleeve 48 is swaged, the turntable 61 is indexed whereupon the pinion 92 engages the rack 94 to rotate the shaft 91 and the chuck 86. (see FIG. 16).

Figure 16:
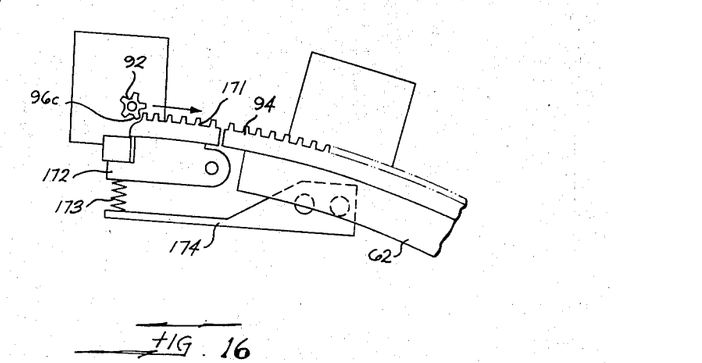
FIG. 16 is a detailed plan view showing the engagement of the pinion on the shaft extending from the chuck of each of the workholders with the rack on the underside of the turntable to rotate the chuck and the pin and sleeve subassembly held therewithin to wind the convolutions of wire on the sleeve as the distributor arm is moved pivotally.

As can be observed from FIG. 16, the rack 94 has a lead-in segment 171 which is attached to a pivotally mounted bar 172. The bar 172 is biased in a clockwise direction, as viewed in FIG. 16, by a spring 173 bearing on a lever 174 that is secured to the base plate 62. By this arrangement, the lead-in segment 171 yields and is moved pivotally in a counterclockwise direction should one of the teeth 96-96 (tooth 96c in FIG. 16) approach the rack segment so as to jam thereagainst. The yielding motion of the lead-in segment 171 facilitates the meshing of the pinion 92 with the rack 94.

The annular cam surface 69 varies from a height slightly above the level of the platform 68 from the first to the fourth work stations and then to a minimum winding height and back to a maximum winding height $h_1$ as the turntable is indexed from the fourth work station through a fifth work station and into a sixth work station at which ones of the mass of shell and cap subassemblies 43-43 are assembled to successive ones of the pin and sleeve subassemblies 42-42.

Moreover, the annular cam surface 69 is configured so that the height $h$ (see FIG. 13) of the cam surface is decreased gradually starting at a point on the cam surface directly above the point of engagement of the pinion 92 with the rack 94. Subsequently, the cam follower 78 riding on the cam surface 69 is urged upwardly to move pivotally the tension arm 74 and overcome the spring 79 to raise the trailing end thereof upwardly and distribute the convolutions of the wire 59 on the sleeve 48 of the pin and sleeve subassembly 42.

In this way the distributor arm 74 is moved pivotally first in a clockwise and then in a counterclockwise direction, as viewed from outside the turntable 61, to array two layers of the wire 59 on the sleeve 48 on each of the pin and sleeve subassemblies 42-42.

Also, it will be recalled that a stud 82 in the workholder 63 cooperates with the boss 85 formed on the one end of the distributor arm 74 to hold the insulated wire 59 between the stud 82 and the top portion of the arm 74. Now, since the trailing end of the wire 59 has been severed, the winding of the wire 59 on the sleeve 48 of the pin and sleeve subassembly 42 pulls the wire between the stud 82 and the boss 85 of the tension arm 74. In this way, the tension device 81 serves to guide the wire 59 extending from the pin and sleeve assembly 42 as the distribution of the wire is made on the sleeve 48 of the pin and sleeve subassembly 42.

As the turntable 61 is indexed into the sixth work station, the pinion 92 is disengages from the rack 94 and the cam follower 79 now resumes following a portion of the cam surface 69 which is generally plannar with the top surface of the platform 68. Hence, the distributor arm 74 remains in a generally constant orientation with a portion of the wire 59 which has been wound on the sleeve 48 held taut by the stud 82 at the trailing end of the arm.

Shell Assembly and Wire Stripping Station

Following the winding operation, the pin and sleeve assembly 42 with the wire 59 around about the sleeve 48 thereof is advanced with the workholder 63 into the sixth work station which includes a stripping device, designated generally by the numeral 200, and a shell subassembly feeding and assembly device, designated generally by the numeral 210 (see FIG. 2).

Welding and Weld Test Station

After one of the shell and cap subassemblies 43-43 has been assembled to the pin and sleeve subassembly 42 in one of the workholders 63-63, the turntable 61 is indexed rotatably in a clockwise direction to move the workholder into a seventh work station and into registration thereat with a welding and weld test device, designated generally by the numeral 230 (see FIG. 2). The welding and weld test device 230 welds the bared portion of the extending part of the wire 59 to the metal cap 56 on the plastic shell 51 and then tests the strength of the weld to the cap by breaking the wire at the joint.

Testing and Sorting Station

After the bared portion of the wire 59 is welded to the cap, the turntable 61 is indexed rotatably in a clockwise direction to move the workholder 63 and chuck 86 to the final station and into registration with a testing and sorting device, designated generally by the numeral 240 (see FIGS. 2 and 26).

The heat coil assembly 41 is removed from the associated chuck 86 and this is permitted to descend. A pneumatic circuit (not shown) is selectively completed to one of a pair of spaced tubes 241-241 in accordance with the test characteristic to direct a blast of air against the heat coil assembly 41 to move the heat coil assembly into an accept bin 242 or a reject bin 243.

After the heat coil assembly 41 has been removed from the workholder 63 at the testing and sorting station, the workholder is indexed through a scrap wire discarding device 244 (see FIG. 2) to the first work station for another cycle of operation. The annular cam surface 69 on the top circular platform 68 is contoured down from the welding and weld test station toward a surface generally at the same level as the surface of the platform, whereupon the distributor arm 74 is urged downwardly by the spring 79 within the block 72 on the workholder 63. As the distributor arm 74 is urged downwardly in a clockwise direction, as viewed externally of the turntable 61 so that the distributor arm is substantially horizontal, the distributor arm passes the scrap wire discarding device 244.

The scrap wire discarding device 244 is used to remove the remaining unused portion of the wire 59 from the workholder 63 and includes a bar 246 having a tapered end. As the workholder 63, now empty except for the remaining portion of the trailing end of the wire held within the tensioning device 81, is moved indexably from the testing and sorting station, the tapered end of the bar 246 is forced between the stud 82 and the boss 85 on the top surface of the distributor arm 74. As the tapered end of the bar 246 is urged under the stud 82, the stud is forced upwardly against the spring mounted screw 84 on the tension device 81 of the workholder 63. The expansion of the groove between the stud 82 and the boss 85 permits the loose end of the wire 59 to be blown from the workholder 63 by an air blast from a tube 247. Now the workholder 63 is devoid of any workpiece of work material and is in condition to receive a new pin and sleeve subassembly 42 from the pin and sleeve subassembly feeding device 100 at the first work station.

Control System and Operation

Figure 23:
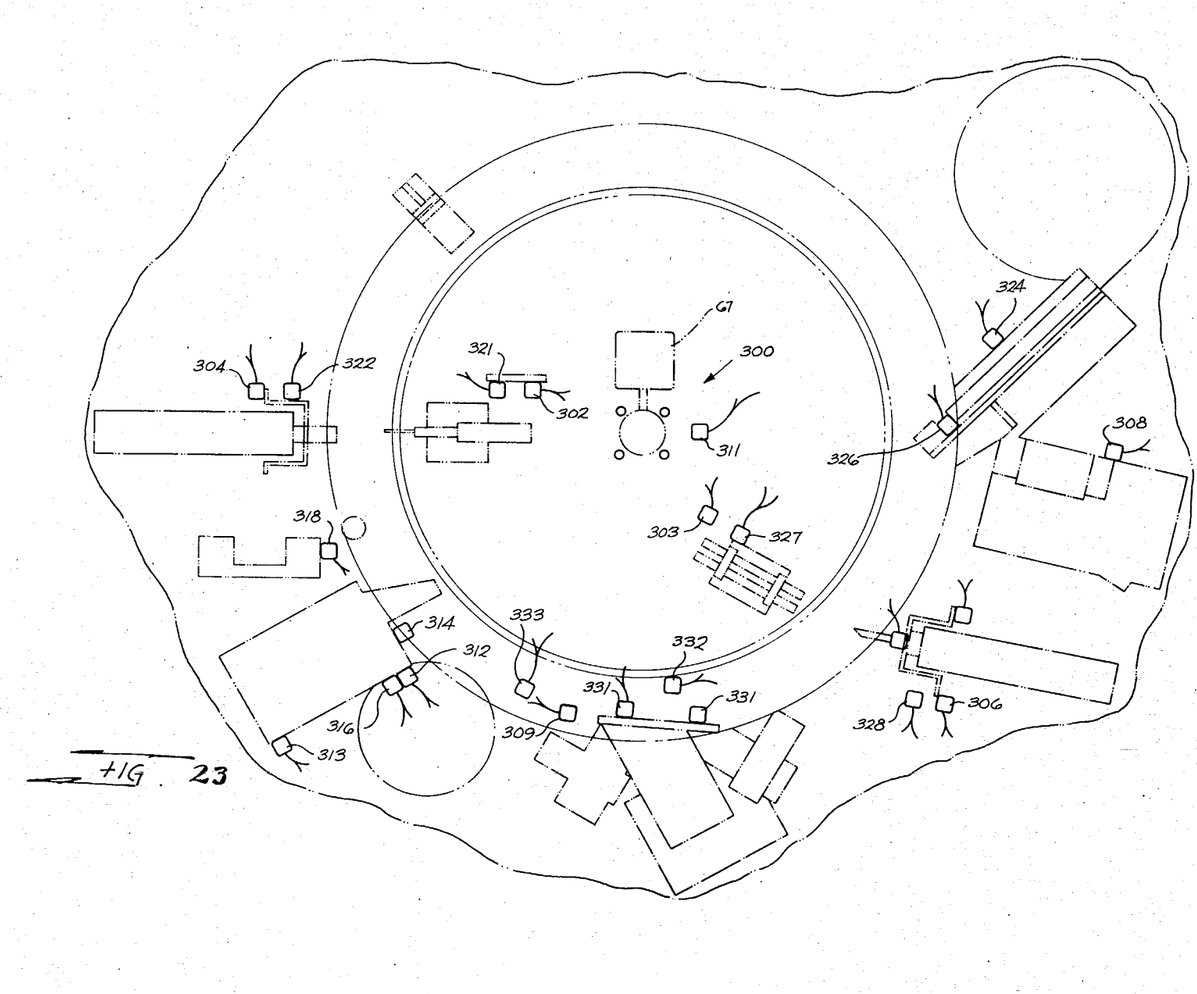
FIG. 23 is a plan view of the turntable and the platform shown in FIG. 2 and illustrating various limit switches which are positioned on the turntable and the platform shown in FIG. 2 and illustrating various limit switches which are positioned on the turntable and the platform for controlling automatically the operation of the assembly apparatus.

In describing the operation of the apparatus 60 for assembling the heat coil assemblies 41–41, reference if made to FIG. 23 which shows various limit switches of an electrical control circuit, designated generally by the numeral 300, for controlling the operation of the apparatus. Initially, an operator depresses a push-button switch (not shown) to initiate the cucle of operation to position one of the pin and sleeve subassemblies 42–42 over one of the chucks 86–86 and for opening the chuck and to operate a clutch (not shown) to index the apparatus 60.

The return of all of the stations to an unoperated position at the beginning of the cycle actuates a plurality of switches. The return of the anvil electrodes of the welding stations 150 and 230 actuate the limit switch 302 and a limit switch 303, respectively, while the return of the welding electrodes thereof operate limit switches 304 and 306, respectively. The return of the cutting blades 171–171 operates a limit switch 307, while the return of a stripping blade at the shell assembly station operates a limit switch 308 to close the contact thereof. Moreover, the return of the testing and sorting device 240 operates the limit switch 309 to close the contact thereof.

When the pin and sleeve subassembly feeding device 100 is returned to an unoperated position, the collet chuck 86 is closed, which completes a circuit (not shown) for the return of the pin and sleeve subassembly placement slide 116. Also, the return of the testing and sorting device 260 to an unoperated position completes a circuit (now shown) to return the collet chuck thereof. Subsequently, the turntable 61 is indexed.

After the turntable 61 has been indexed and the index clutch (not shown) disengaged, and if the turntable has been indexed through a predetermined angle of rotation, the workholders 63–63 are precisely aligned with the work stations and a limit switch 311 is actuated by a spring biased indexing pin (not shown) on the base 62 which is urged into one of the plurality of holes (not shown) in the turntable that are aligned with the workholders. Should the turntable 61 not be indexed fully, the pin (not shown) will not engage one of the index holes (not shown) and the limit switch 311 is not actuated.

The air cylinder 126 is actuated to move downwardly the block 128 and open the collet chuck 86 of the workholder 63 in registration with the feeding device 100. Finally, a circuit (not shown) is completed to operate the air cylinder 117 to advance the slide 116 to position one of the pin and sleeve subassemblies 42–42 over the workholder 63 in registration with the feeding device 100.

As the collet chuck 86 is opened, and the slide 116 is moved outwardly over the pin and sleeve subassembly 42 in the leading one of the workholders 63–63, the arm 120 actuates a limit switch 312 and a limit switch 313 (see FIGS. 10 and 23) to complete a circuit (not shown) to operate the air cylinder 122. The operation of the air cylinder 122 moves downwardly the insert ram 121 to move the pin and sleeve subassembly 42 through the nest 114 and into the chuck 86 of the leading one of the workholders 63–63.

As the insert ram 121 is moved downwardly, the insert ram actuates a limit switch 314. The jaws of the collet chuck 86 are spring returned to a normal closed position with the pin and sleeve subassembly 42 held therebetween. As the collet chuck 86 is closed, the limit switch 316 is actuated to close the contact thereof and complete a circuit to actuate the air cylinder 117 and return the pin and sleeve placement slide 116. As the slide 116 is withdrawn to the left, as viewed in FIG. 10, the limit switch 313 is actuated to move retractably the insert ram 121.

As the insert ram 121 is returned upwardly, the limit switch 314 is actuated to complete a circuit to condition partially the all stations return circuit (not shown). It should be observed that after each indexing movement and the operation of the work tools at the work stations, that the index clutch (not shown) will be engaged to render effective the continuously running motor 67 to index the turntable 61.

Simultaneously, with the operation of the pin and sleeve subassembly feeding device 100 at the first work station, the air cylinders 135–135 are moved downwardly, as viewed in FIG. 12 with the upper hold-down bars 137–137 clamping the wire 59 therebetween.

The cylinder 144 is actuated to advance the wire stripping blade 141 to strip a predetermined length "L" of the wire 59 which is subsequently welded to the sleeve 48 of the pin and sleeve subassembly 42. As the blade 141 is moved upwardly and to the left, as viewed in FIG. 12, by the rod 143, the cam follower 145 traces the cam opening 146.

An air blast device (not shown) is operated to direct a stream of air against the insulation being removed from the wire 59. Should the wire 59 be broken during the stripping operation, the tension on the wire 59 is released to permit a feeler to actuate a limit switch 318 to complete a circuit to indicate a broken wire (see FIG. 12).

Moreover, the air cylinder 163 (see FIG. 13) is actuated to advance the anvil electrode 151 into engagement with the sleeve 48 of the pin and sleeve subassembly 42 which is positioned in the workholder 63 currently in registration with the welding device 150. The movement of the anvil electrode 151 into engagement with the sleeve 48 actuates limit switch 321 to close the contact thereof and complete a circuit through a counter (not shown) to cycle the welding electrode 152 into engagement with the stripped portion of the wire 59 and the sleeve 48 to weld the wire to the sleeve of the pin and sleeve subassembly 42.

As the welding electrode 152 is advanced into engagement with the wire 59, the welding electrode actuates limit switch 322 to close a contact thereof and complete a circuit for advancing the anvil electrode 151.

To complete the cycle of the welding electrode 152, the welding electrode is returned to a normal retracted position. As the welding electrode 152 is moved to the left, as viewed in FIG. 13, the welding electrode actuates the limit switch 304. The actuation of the limit switch 304 conditions partially the all stations return circuit (not shown). Then the anvil electrode 151 is returned radially inward and to the right, as viewed in FIG. 13, and actuates the limit switch 302 to close the contact thereof to further condition partially the all stations return circuit (not shown).

Simultaneously, with the feeding of a pin and sleeve subassembly 42 in the first work station and the feeding of the wire 59 and the welding of a stripped portion thereof to the sleeve 48 of another pin and sleeve subassembly 42 is registration with the welding device 150, the combined severing and swaging device 180 is operated to swage the top rim portions of the sleeve, and to sever the wire at the third work station. Then a length of the wire 59 has a leading end welded to the pin and sleeve subassembly 42 in the third work station and the trailing end thereof held taut in the tentioning device 81 of the workholder in the third work station with a new leading end of the wire which continues to the supply spool 131 welded to the pin and sleeve subassembly in the second work station.

The air cylinder 185 is operated to move the actuator ram 189 within the bore 191 of the tool holder 192. The tool holder 192 is moved to advance the swaging tool 193 over the pin and sleeve subassembly 42 to receive the top rim portions of the subassembly. The collar 188 engages the top one of the arms 182-182 whereupon the pin 144 is received in the stopped bore 194 and urges the headed seating pin 195 upwardly within the bore.

The member 197 which is attached rigidly to the underside of the tool holder 192 engages the wire 59 immediately adjacent the joint of the wire and the sleeve 48. If the weld of the wire 59 to the sleeve 48 is acceptable, the member 297 breaks the wire immediately adjacent the joint. The breaking of the wire 59 immediately adjacent the joint on the sleeve 48 eliminates any possible shorting our problem which may occur when the use of priorly used cutting blades sever the wire but leave a short portion of the wire extending beyond the joint. As the tool block 186 is retracted, the rod 185 moves the ram 189 into engagement with the cutting blade 198 which is normally biased in a counterclockwise direction, as viewed in FIG. 19. Then as the cutting blade 198 is moved pivotally in a clockwise direction, the cutting blade cooperates with the blade 199 which is attached rigidly to the tool block. If the joint is defective and the wire 59 is broken by the member 197, the trailing end of the preceding length of wire moves out from between the blades 198 and 199 and although the blade 198 is actuated, the blades do not sever the wire. If the joint is defective, the blades 198 and 199 cut the wire 59 at the joint adjacent to, but spaced from the defective joint. As the tool block 186 is moved upwardly, the seating pin 195 is urged downwardly in the bore 194 by the spring 196 to impart a pushing force thereto to eject the pin and sleeve subassembly 42 to maintain pin 44 seated in the chuck 86.

Then as the turntable 61 is indexed in a clockwise direction, as viewed in FIG. 2, the cam follower 78 on the distributor arm 74 follows the lowered contoured configuration of the annular cam surface 69 to permit the spring 79 to move pivotally the distributor arm in a downward direction. Then, as the height of the cam surface 69 increases, the trailing end of the distributor arm 74 is moved upwardly to distribute a second layer of convolutions of the wire 59 on the sleeve 48 as the pin and sleeve subassembly 42 is rotated with the chuck 86.

At the close of the wire distribution cycle, the turntable 61 has been indexed to advance the pin and sleeve subassembly 42 with the wire 59 distributed on the sleeve 48 thereof into the sixth work station where one of a mass of the shell and cap subassemblies 43-43 is assembled to the pin and sleeve subassembly.

At the seventh station, a bared portion of the trailing end of the wire 59 is welded to the cap 59 of the shell and cap subassembly 43 in the workholder 63 and the strength of the joint is tested by the welding and testing device 230.

After the trailing end of the wire 59 has been welded to the cap 56, the pin and sleeve subassembly is indexed to an eighth and final work station where an electrical characteristic of the heat coil assembly 41 is determined and where the heat coil assembly is sorted in accordance with the electrical characteristic.

Then, as the chuck 86 is closed after the heat coil assembly 10 is released therefrom, the limit switch 309 is actuated to complete the all stations return circuit whereupon the index clutch (not shown) permits the turntable 61 to be rotated indexably for another cycle of automatic operation.

And, finally, as the turntable 61 is indexed to move the workholder 63 from the testing and sorting device 260 to the feeding device 100, a scrap wire discarding device 244 engages the tensioning device 81 to force open the groove therein to permit an air blast from a tube 247 to direct the scrap wire away from the workholder.

It is to be understood that the above-described arrangements are simply illustrative of the principles of the invention. Other arrangements may be devised by those skilled in the art which will embody the principles of the invention and fall within the spirit and scope thereof.

What is claimed is:

1. An apparatus for forming a part, and for testing a joint of a portion of a wire bonded to the part and extending transversely of the part and for severing the wire adjacent to the joint, which comprises:

means for holding the part;
a forming tool for forming the part;
means mounting the forming tool for movement longitudinally axially of the part and transversely of the wire;
testing means mounted on the forming tool for engaging the wire adjacent to the joint as the part is being formed and for imparting a force to the wire to test the joint and to break the wire immediately adjacent effective joints tested;
means for moving the forming tool into engagement with the portion of the part to be formed and the testing means into engagement with the wire adjacent to the joint and for then retracting the forming tool and the testing means subsequent to the forming and the testing operations; and
auxiliary means mounted pivotally on the forming tool and operated as the forming tool and testing means are retracted for cutting the wire at a point adjacent to but spaced from defective joints.

2. An apparatus for swaging a part and for testing a joint of a wire joined to and extending transversely of the part and for severing the wire adjacent to the joint, which comprises:

means for holding the part;
a swaging tool movable longitudinally of the part and transversely of the wire and having a bore for receiving the elongated part, the walls of the entrance of the bore designed to swage the part;
an ejecting pin received in the bore;
first means rigidly attached to the swaging tool and movable in a path of travel into engagement with the wire immediately adjacent the joint as the part is received in the bore imparting a force to the wire to test the joint and to break the wire immediately adjacent effective joints tested;
second means rigidly attached to the swaging tool for moving transversely of the wire at a point spaced from the joint;
means for moving the swaging tool into engagement with the part and the first means rigidly attached to the swaging tool into engagement with the wire and for further moving the swaging tool and the first means to swage the part and break the wire immediately adjacent effective joints and for then retracting the swaging tool and the first means;
means pivotally mounted on the swaging tool and operated when the swaging tool is retracted for cooperating with the second means to cut the wire at a point adjacent to, but spaced from, defective joints, and
means positioned in the bore for urging the pin into engagement with the end of the part to eject the part from the bore and maintain the part seated in the holding means as the swaging tool is retracted.

* * * * *